United States Patent
Villemin et al.

(10) Patent No.: US 10,950,069 B2
(45) Date of Patent: Mar. 16, 2021

(54) METHOD FOR PROVIDING A DIAGNOSTIC ON A COMBINED HUMIDITY AND TEMPERATURE SENSOR

(71) Applicant: MEAS France, Toulouse (FR)

(72) Inventors: Francois-Xavier Villemin, Toulouse (FR); Nicolas Saravia, Toulouse (FR); Souhail Chreif, Toulouse (FR)

(73) Assignee: MEAS FRANCE, Toulouse (FR)

( * ) Notice: Subject to any disclaimer, the term of this patent is extended or adjusted under 35 U.S.C. 154(b) by 126 days.

(21) Appl. No.: 15/925,855

(22) Filed: Mar. 20, 2018

(65) Prior Publication Data
US 2018/0276914 A1 Sep. 27, 2018

(30) Foreign Application Priority Data
Mar. 21, 2017 (EP) .................. 17305319

(51) Int. Cl.
*G07C 5/08* (2006.01)
*G01K 15/00* (2006.01)
(Continued)

(52) U.S. Cl.
CPC ......... *G07C 5/0808* (2013.01); *F02D 41/222* (2013.01); *G01K 15/007* (2013.01);
(Continued)

(58) Field of Classification Search
CPC ...... G07C 5/0808; F02D 41/222; G01N 25/64
(Continued)

(56) References Cited

U.S. PATENT DOCUMENTS 5,809,437 A * 9/1998 Breed .................. B60N 2/0232
  701/29.1
9,224,252 B1  12/2015 Guo et al.
(Continued)

FOREIGN PATENT DOCUMENTS

EP      2508881 A1    10/2012
JP   2001227790 A     8/2001
(Continued)

OTHER PUBLICATIONS

English translation of JP2001227790 description. accessed via worldwide.espacenet.com on Sep. 12, 2019.*
European Search Report, dated Sep. 29, 2017, 7 pages.

*Primary Examiner* — Nimeshkumar D Patel
*Assistant Examiner* — Jean F Morello

(57) ABSTRACT

A method provides a diagnostic on a combined humidity and temperature sensing device including a humidity sensor having a humidity sensing element, a temperature sensor, and a heater. The method comprises obtaining a first temperature and a first relative humidity, heating the humidity sensing element with the heater, obtaining a second temperature and a second relative humidity after heating the humidity sensing element, and determining a difference between the first temperature and the second temperature and a difference between the first relative humidity and the second relative humidity. Diagnostic information representative of a possible malfunction of the humidity sensor is output when the difference between the first temperature and the second temperature is higher than a predetermined temperature difference threshold and the difference between the first relative humidity and the second relative humidity is lower than a predetermined humidity difference threshold.

16 Claims, 3 Drawing Sheets

(51) Int. Cl.
  *G01N 27/12* (2006.01)
  *F02D 41/22* (2006.01)
  *G01N 25/64* (2006.01)
  *F02M 35/10* (2006.01)

(52) U.S. Cl.
  CPC .......... *G01N 25/64* (2013.01); *G01N 27/121* (2013.01); *F02M 35/10393* (2013.01)

(58) Field of Classification Search
  USPC ...................................................... 73/29.05
  See application file for complete search history.

(56) References Cited

U.S. PATENT DOCUMENTS

| | | | |
|---|---|---|---|
| 2004/0237646 A1 | 12/2004 | Fujita et al. | |
| 2012/0253691 A1* | 10/2012 | Graf ..................... | G01N 27/223 702/24 |
| 2014/0298880 A1* | 10/2014 | Pursifull ............... | F02D 41/222 73/1.06 |
| 2018/0003572 A1* | 1/2018 | Garsd .................... | G01K 13/00 |

FOREIGN PATENT DOCUMENTS

| | | |
|---|---|---|
| JP | 2010237130 A | 10/2010 |
| WO | 2016111253 A1 | 7/2016 |

\* cited by examiner

METHOD FOR PROVIDING A DIAGNOSTIC ON A COMBINED HUMIDITY AND TEMPERATURE SENSOR

CROSS-REFERENCE TO RELATED APPLICATION

This application claims the benefit of the filing date under 35 U.S.C. § 119(a)-(d) of European Patent Application No. 17305319.0, filed on Mar. 21, 2017.

FIELD OF THE INVENTION

The present invention relates to a method for performing an in-range diagnostic on a combined humidity and temperature sensor and, more particularly, to determining the validity or relevance of a measurement in a combined humidity and temperature sensor.

BACKGROUND

In the automotive industry, on-board diagnostic (OBD) systems are commonly used for providing self-diagnostics capabilities for various vehicle components. For instance, OBD systems can provide real-time information regarding the status of a particular vehicle component or subsystem to a user of the vehicle, or to a technician during a maintenance operation. In some countries or regions, certain types of self-diagnostics can be compulsory upon request by local or regional environmental protection agencies, and a lack thereof may result in a fine.

Some self-diagnostics were previously limited to out-of-range diagnostics; sensors outputting a value outside of a predefined validity range for the sensor. It is, however, increasingly requested by environmental protection agencies and the automotive industry to provide in-range diagnostic capabilities. An in-range diagnostic analyzes a sensor's output when the output value is within the predefined validity range for the sensor but is otherwise incorrect according to current application conditions. For example, assuming application conditions in which a current measurable temperature is 20° C. and a temperature sensor is configured to measure temperatures between 0° C. and 60° C., a temperature of 40° C. output by the temperature sensor would fall in the range of measurable temperatures but would be incorrect and, therefore, non-representative of the current application conditions.

It is further known to use humidity sensors for measuring humidity, for example, in an air intake of an internal combustion engine. As described for instance in U.S. Patent Application No. 2004/0237646 A1, such humidity sensors have a heating element used for heating and thereby cleaning the humidity sensing element of the humidity sensor. It is also known to combine these humidity sensors with a temperature sensor to measure a temperature in the vicinity of the humidity sensing element.

In the automotive industry, vehicles may have more than one temperature sensor; it is known to perform in-range diagnostics on a given temperature sensor by comparing its output values with the values output by other temperature sensors, for instance, other temperature sensors arranged in nearby areas of the vehicle. While this method could also be applied in order to identify a malfunctioning humidity sensor, it is not a cost efficient method.

Methods of diagnosing the validity of a humidity sensor output signal are known, for instance from U.S. Pat. No. 9,224,252 B1, which describes a method in which a humidity sensor output signal has passed a rationality diagnostic if the output signal is changing sufficiently over time. When the output signal is not changing sufficiently, this known method relies on a humidity capacity index to determine rationality or validity, which is based on combined temperature and pressure measurements. This and other known methods are limited to out-of-range diagnostics of the humidity sensor and are not sufficient to provide in-range diagnostics, especially regarding which subcomponent of a humidity sensor might be failing.

SUMMARY

A method provides a diagnostic on a combined humidity and temperature sensing device including a humidity sensor having a humidity sensing element, a temperature sensor, and a heater. The method comprises obtaining a first temperature and a first relative humidity, heating the humidity sensing element with the heater, obtaining a second temperature and a second relative humidity after heating the humidity sensing element, and determining a difference between the first temperature and the second temperature and a difference between the first relative humidity and the second relative humidity. Diagnostic information representative of a possible malfunction of the humidity sensor is output when the difference between the first temperature and the second temperature is higher than a predetermined temperature difference threshold and the difference between the first relative humidity and the second relative humidity is lower than a predetermined humidity difference threshold.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
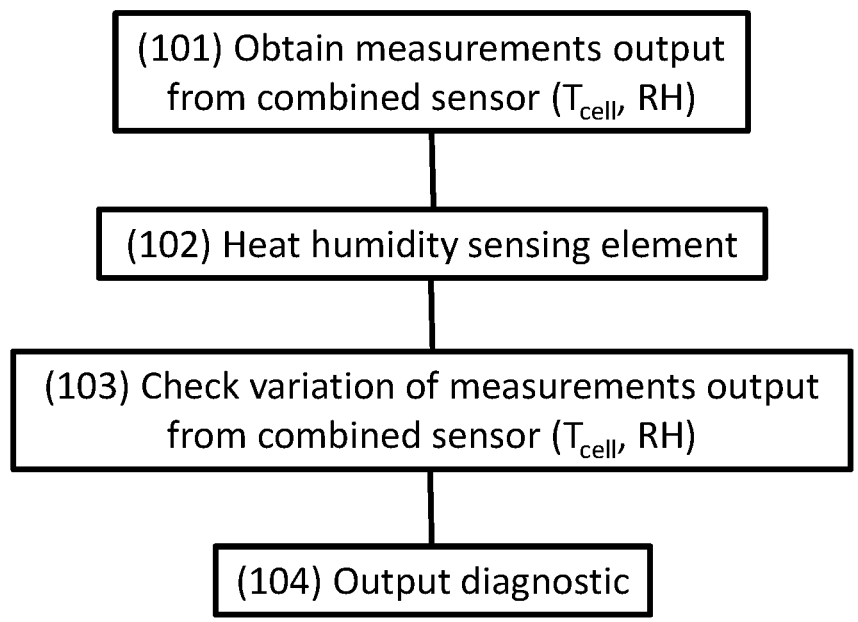
FIG. 1 is a flow diagram of a method for providing a diagnostic on a combined humidity and temperature sensing device.

Embodiments of the present invention will be described hereinafter in detail with reference to the attached drawings, wherein like reference numerals refer to the like elements. The present invention may, however, be embodied in many different forms and should not be construed as being limited to the embodiments set forth herein; rather, these embodiments are provided so that the disclosure will be thorough and complete and will fully convey the concept of the invention to those skilled in the art.

Figure 2:
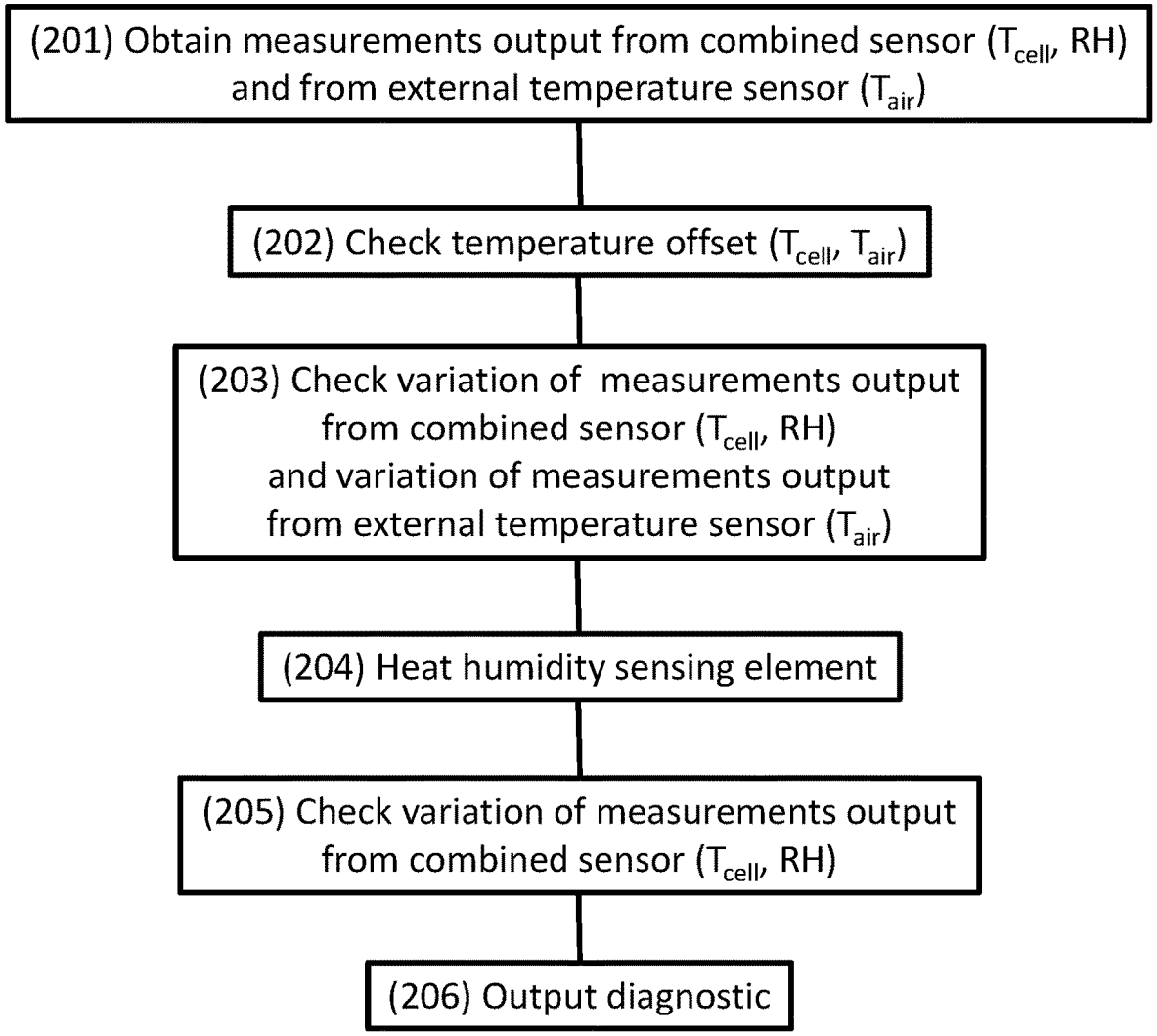
FIG. 2 is a flow diagram of another method for providing a diagnostic on a combined humidity and temperature sensing device.
Figure 3:
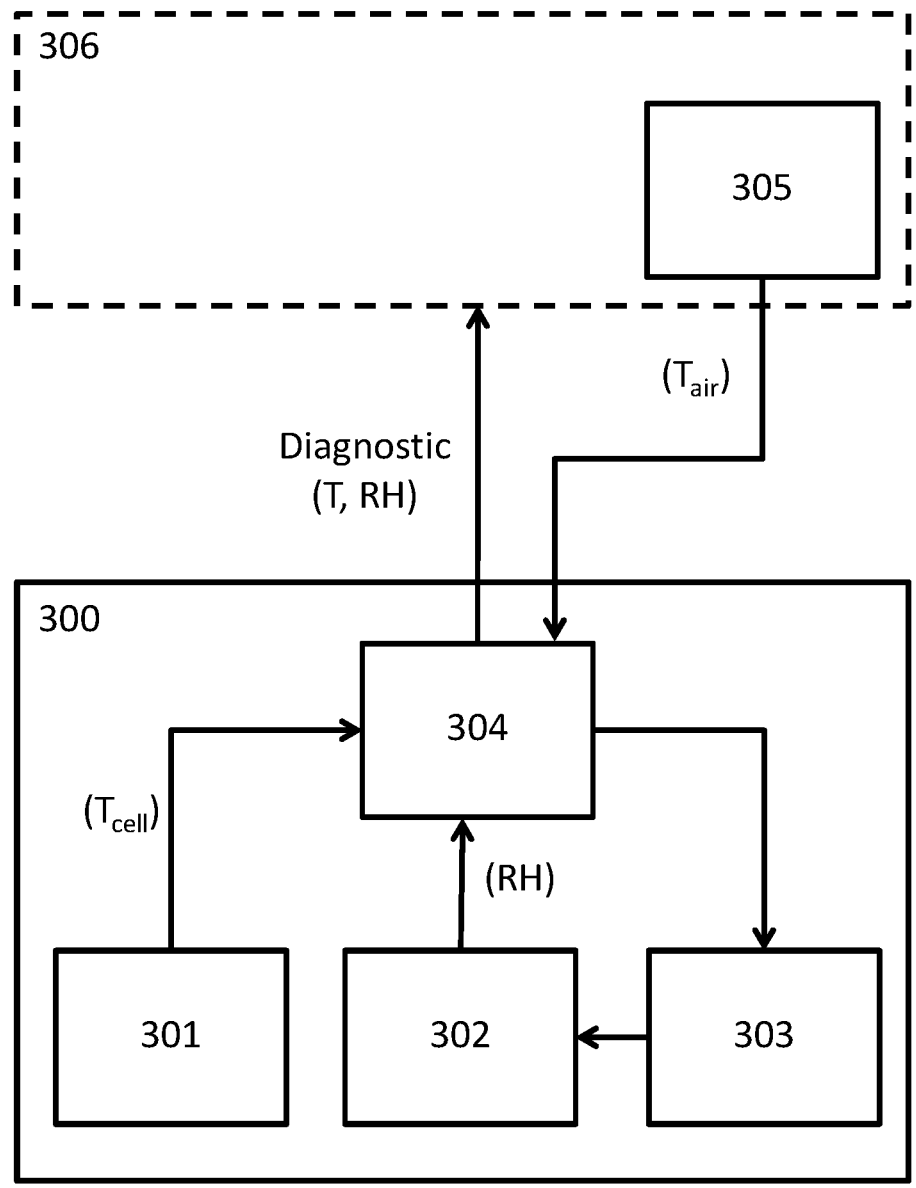
FIG. 3 is a schematic diagram of the combined humidity and temperature sensing device.

A method for providing a diagnostic on a combined humidity and temperature sensing device is shown in FIGS. 1 and 2. An exemplary combined humidity and temperature sensing device 300 is shown in FIG. 3 and includes a temperature sensor 301, a humidity sensor 302, and a heater 303.

The temperature sensor 301 is positioned in the vicinity of the humidity sensor 302 and is configured to measure and output a local temperature Tcell. The humidity sensor 302 is configured to measure and output a local relative humidity RH. The heater 303 is configured to heat a humidity sensing element of the humidity sensor 302. The temperature sensor 301 can be affected by local temperature variations around the humidity sensor 302, whether natural or caused by the heater 303, as explained hereafter. Accordingly, the temperature sensor 301 can output a temperature which is representative of the immediate environment of the humidity sensor 302, or even, if so desired, of the humidity sensing cell of the humidity sensor 302. In an embodiment, the heater 303 could be arranged and configured to heat a temperature sensing cell of the temperature sensor 301 directly or indirectly.

In an embodiment, the combined humidity and temperature sensing device 300 is configured so that respective validity ranges can be predefined for the measured local temperature Tcell and relative humidity RH. The present invention is not limited to in-range diagnostics, however, and can be generally used to diagnose the operation of the combined humidity and temperature sensing device 300.

As shown in FIG. 1, a method for providing a diagnostic on the combined humidity temperature sensor 300 obtains a first local temperature Tcell,1 and a first relative humidity RH1 output by the combined humidity and temperature sensing device 300 in a step 101. These measurements can be realized essentially simultaneously, or at least close enough in time, such that relative humidity can be output as a function of temperature.

After step 101, for instance after a predefined time has passed, a command is output to heat up the humidity sensing element using the heater 303 in a step 102. As a result, an increase in the local temperature Tcell and a decrease in the local relative humidity RH are expected if all elements of the combined humidity and temperature sensing device 300 are operating correctly.

After step 102, variations between a local temperature and a local relative humidity measured after heating the humidity sensing element and the corresponding values measured before heating the humidity sensing element are checked in a step 103. Step 103 includes obtaining a second local temperature Tcell,2 and a second local relative humidity RH2 output by the combined humidity and temperature sensing device 300 after performing step 102 of heating the humidity sensing element using the heater 303. The second measurements are carried out after a predetermined amount of time has passed following the initiation of the heating in step 102.

In step 103, a difference can then be determined between the first local temperature Tcell,1 and the second local temperature Tcell,2, for instance $\Delta Tcell=|Tcell,2-Tcell,1|$. Similarly, a difference can then be determined between the first local relative humidity RH1 and the second local relative humidity RH2, for instance $\Delta RH=|RH2-RH1|$. It should be noted that, depending on the embodiments, these differences do not need to be absolute values.

In a step 104, the method outputs a diagnostic comprising information representative of a condition of the humidity sensor 302 based on results of the determinations in step 103.

If it is determined that, according to expectations, a significant temperature increase has indeed occurred after step 102, or that the temperature difference $\Delta Tcell$ is above a predetermined temperature difference threshold indicative of a significant variation in temperature, the diagnostic in step 104 indicates that the temperature sensor 301 is functioning as expected.

When it is determined that a significant temperature increase has occurred, if it is also determined that, also according to expectations, a significant corresponding drop in local relative humidity has indeed occurred after step 102, or that the relative humidity difference $\Delta RH$ is also above a predetermined relative humidity difference threshold indicative of a significant variation in humidity, the diagnostic in step 104 indicates that the humidity sensor 302 and the heater 303 are also functioning as expected. However, when it is determined that a significant temperature increase has occurred as expected after step 102, if it is determined that, contrary to expectations, no corresponding drop in local relative humidity has occurred after step 102, or that the relative humidity difference $\Delta RH$ is, in fact, below the predetermined relative humidity difference threshold indicative of a significant variation in humidity, the diagnostic in step 104 indicates that the humidity sensor 302 is malfunctioning or at least likely to be malfunctioning.

In other embodiments, additional diagnostics output in step 104 can be based on results of the determinations in step 103. For instance, if it is determined that, contrary to expectations, no significant temperature increase has occurred after step 102, or that the temperature difference $\Delta Tcell$ is below the predetermined temperature difference threshold indicative of a significant variation in temperature, the diagnostic seeks a reference temperature.

If no reference temperature is available to verify whether the temperature sensor 301 is functioning as expected or not, and if it is determined that, according to expectations, a significant corresponding drop in local relative humidity has actually occurred after step 102, or that the relative humidity difference $\Delta RH$ is above the predetermined relative humidity difference threshold indicative of a significant variation humidity, the diagnostic in step 104 indicates that the temperature sensor 301 is malfunctioning or at least likely to be malfunctioning. However, if it is determined that, contrary to expectations, no drop in local relative humidity has occurred after step 102, or that the relative humidity difference $\Delta RH$ is, in fact, below the predetermined relative humidity difference threshold indicative of a significant variation humidity, the diagnostic in step 104 indicates that the heater 303 is malfunctioning or at least likely to be malfunctioning.

In other embodiments, a suspicion that the temperature sensor 301 could be malfunctioning could be confirmed using, for instance, a reference temperature and/or an external separate temperature sensor. Depending on the result of this confirmation, it could also be confirmed that, rather than the temperature sensor 301, the heater 303 is the malfunctioning element. Also optionally, based on a diagnostic in step 104 comprising information representative of a suspicion and/or a confirmation that the heater 303 is malfunctioning, the method can further comprise a step of stopping an activity of the heater 303, for instance in order to prevent possible future damage of the humidity sensing element.

In the embodiment of the method shown in FIG. 2, a diagnostic will be provided on the combined humidity and temperature sensing device 300, however, an additional temperature sensor 305 shown in FIG. 3 is also provided different from the temperature sensor 301. The additional temperature sensor 305 is configured to measure an ambient temperature, Tair, outside of the combined humidity and temperature sensing device 300. The additional temperature sensor 305 is arranged such that the measured ambient temperature Tair is representative of an ambient temperature in a vicinity of the combined humidity and temperature sensing device 300, outside of the combined humidity and temperature sensing device 300 such that it is not influenced by local variations of temperature caused by the heater 303. The additional temperature sensor 305 is arranged such that the measured ambient temperature Tair is representative of an ambient temperature in a vicinity of the combined humidity and temperature sensing device 300, such that, when the heater 303 is not active, the temperatures output by the temperature sensor 301 and the additional temperature sensor 305 can be expected to be substantially similar.

Before heating the humidity sensor 302 in step 102 of FIG. 1, the method in FIG. 2 includes a step 201 of obtaining an external temperature Tair output from the additional external temperature sensor 305. In this step, a local temperature Tcell is also obtained from the temperature sensor 301 and a local relative humidity RH is obtained from the humidity sensor 302. These measurements are realized essentially simultaneously, or at least close enough in time, such that the operation conditions are essentially the same.

Then, still before heating the humidity sensor 302 in step 102 of FIG. 1, a difference between the local temperature Tcell and the external temperature Tair is determined in a step 202, for instance $\Delta T=|Tcell-Tair|$. Here again, it should be noted that, depending on the embodiments, this difference does not need to be an absolute value.

If it is determined that the temperature difference $\Delta T$ is smaller than a predetermined temperature difference threshold, a diagnostic could then output information that the temperature sensor 301 seems to be working as expected. The method steps described in FIG. 1 could then be performed, using for instance the measurements obtained for the local temperature Tcell and relative humidity RH in step 201 as the first temperature and first relative humidity in step 101. In this case, it is essentially determined that the temperature sensor 301 of the combined humidity and temperature sensing device 300 should be functioning as expected. Thus, based on results of the determinations in step 103 described above, this diagnostic regarding the temperature sensor 301 is used to check if another element is malfunctioning and, accordingly, provide a diagnostic in step 104 as described above in relation to the method shown in FIG. 1.

However, if it is determined that the temperature difference $\Delta T$ is greater than a predetermined temperature difference threshold, at least a suspicion of a possibly malfunctioning temperature sensor could be raised for either the external temperature sensor 305 and/or the temperature sensor 301. The defective temperature sensor could then be identified using, for instance, a temperature reference to be compared to the local temperature Tcell and to the ambient temperature Tair. Then, the method steps of the previous embodiment shown in FIG. 1 could be carried out as described above.

If it is determined that the temperature difference $\Delta T$ is greater than a predetermined temperature difference threshold, and no temperature reference is available, only a suspicion of a possibly malfunctioning temperature sensor may be raised. The suspicion could be output as part of diagnostic information resulting of the comparison between the measured external and local temperatures.

In order to provide a more complete diagnostic, if it is determined that the temperature difference $\Delta T$ is greater than a predetermined temperature difference threshold, in the embodiment FIG. 2, in step 201 it is also possible to consider that the external temperature Tair is a first external temperature Tair,1, and that the local temperature is a first local temperature Tcell,1. Accordingly, the local relative humidity RH can also be considered to be a first local relative humidity RH1. As explained above, these measurements are performed before heating the humidity sensor 302. In fact, these measurements can be performed even before the step of measuring the first temperature and relative humidity described in relation to step 101 in FIG. 1.

When it is determined in step 202 that the temperature difference $\Delta T=|Tcell,1-Tair,1|$ between the first local temperature Tcell,1 and the first external temperature Tair,1 is greater than a predetermined temperature difference threshold, the method can further comprise a subsequent step 203 of checking variations, in particular dynamically, of the ambient or external temperature Tair, of the local temperature Tcell, and of the local relative humidity RH. Thus, step 203 includes obtaining a second ambient temperature Tair,2, a second local temperature Tcell,2, as well as a second local relative humidity RH2 output by the external temperature sensor 301. These second measurements can be carried out after a predetermined amount of time has passed following the first measurements carried out in step 201.

In step 203, differences are determined between the first and second ambient temperatures, $\Delta Tair=|Tair,2-Tair,1|$, between the first and second local temperatures, $\Delta Tcell=|Tcell,2-Tcell,1|$, and between the first and second relative humidity, $\Delta RH=|RH2-RH1|$. Again, it should be noted that, depending on the embodiments, these differences do not need to be absolute values.

Conditions can then be determined to continue with the method steps shown in FIG. 1. In particular, if it is determined in step 203 that there has been essentially no variation in ambient temperature or that a variation in ambient temperature $\Delta Tair$ is below a predefined significance threshold, and that there has been essentially no variation in local temperature or that a variation in local temperature $\Delta Tcell$ is below a predefined significance threshold, which can be the same or different as the predefined significant threshold for ambient temperature, and that there has been essentially no variation in local relative humidity or that a variation in local relative humidity $\Delta RH$ is below a predefined significance threshold, then the method can proceed to a step 204.

In step 204, the humidity sensing element is heated using the heater 303, corresponding essentially to step 102 in FIG. 1. Here, the second local temperature and the second local relative humidity obtained in step 203 could be used as the first local temperature and first local relative humidity in step 101. Alternatively, between steps 203 and 204, new measurements of the local temperature and relative humidity could be performed, as described in relation to step 101 in FIG. 1.

After step 204, the method can also comprise a step 205 of checking variations of the local temperature and relative humidity between the measurements performed before step 204 and new values measured after step 204. Thus, step 205 corresponds essentially to step 103 in FIG. 1. The method shown in FIG. 2 includes a subsequent step 206 of outputting a diagnostic based on the determinations made in step 205. This step corresponds essentially to step 104 in FIG. 1.

In the embodiment shown in FIG. 2, following any of the various steps described in relation to FIG. 1 or 2, if it is determined that the temperature sensor 301 is malfunctioning, the diagnostic output in step 206 could also comprise outputting information that the combined humidity and temperature sensing device 300 is switched to a degraded mode. In the degraded mode, the combined humidity and temperature sensing device 300 could output the measured relative humidity RH as a function of the ambient temperature Tair measured by the external temperature sensor 305 rather than the local temperature Tcell output by the malfunctioning temperature sensor 301. In this way, a user could still receive at least some degree of usable information.

In an embodiment, steps 101 or 201 could be preceded by or could comprise waiting a predetermined amount of time. For instance, in systems requiring a certain amount of time before being stabilized, it could be advantageous to only start a full diagnostic, in particular a full in-range diagnostic, only after a predefined startup cycle.

By cycling through the method steps described above, in any of the embodiments and variants thereof described in relation to FIGS. 1 and 2, the method could allow performing a full diagnostic, in particular a full in-range diagnostic, over a certain period of time, for instance a period of activity of a system in which the method is used. Cycles could be repeated a predefined number of times and/or could be separated by a predefined amount of time.

In an embodiment, the methods of FIGS. 1 and 2 could be used for controlling a calibration and/or for auto-calibrating the combined humidity and temperature sensing device 300.

The combined humidity and temperature sensing device 300, as shown in FIG. 3 outputs the measured local temperature Tcell and/or the measured relative humidity RH to a customer system 306 using the combined humidity and temperature sensing device 300. The combined humidity and temperature sensing device 300 could be configured so that respective validity ranges can be predefined for the measured local temperature Tcell and relative humidity RH, for instance as required by the customer system 306.

As shown in FIG. 3, the additional temperature sensor 305 could be provided as an element of an external system, for instance the customer system 306, which could be configured for receiving outputs of the additional temperature sensor 305 and of the combined humidity and temperature sensing device 300. In the embodiment shown in FIG. 3, the additional temperature sensor 305 is arranged outside of the combined humidity and temperature sensing device 300. In other embodiments, it could be provided in the combined humidity and temperature sensing device 300, sufficiently spaced apart and/or shielded from the heater 303.

The system further comprises a processor 304 configured to execute an algorithm stored on a non-transitory computer readable medium to perform the methods shown and described in FIGS. 1 and 2 and/or any of its variants. The processor 304 receives the local temperature Tcell output from the temperature sensor 301 and the local relative humidity RH output from the humidity sensor 302. In an embodiment, the processor 304 is an integral part of the combined humidity and temperature sensing device 300. The processor 304 is configured to control the heater 303, in particular for activating or stopping the heater 303 so as to initiate or stop heating of the humidity sensing cell of the humidity sensor 302, and when applicable also of the temperature cell of the temperature sensor 301. In some embodiments, the processor 304 can also be configured for receiving an ambient temperature Tair output from the additional temperature sensor 305.

The processor 304 outputs diagnostic information representative of a condition of the temperature sensor 301 and/or of the humidity sensor 302 and/or of the heater 303 as described with respect to FIGS. 1 and 2 above. In an embodiment, the processor 304 outputs degraded information to the customer system 306, for instance following a determination that the temperature sensor 301 may be malfunctioning. In this situation, rather than outputting temperature and humidity information T, RH comprising the relative humidity RH measured by the humidity sensor 302 and the local temperature Tcell measured by the temperature sensor 301, in the degraded mode, the combined humidity and temperature sensor 300, and in particular the processor 304, could replace the local temperature Tcell with the ambient temperature Tair. In other variants, both temperatures Tcell, Tair could be output together with a relative humidity RH, with an indication that the local temperature Tcell has failed a diagnostic, in particular an in-range diagnostic. In an embodiment, the processor 304 controls a calibration and/or performs an auto-calibration of the combined humidity and temperature sensing device 300 based on results of the determinations in the method steps.

An exemplary embodiment of the combined humidity and temperature sensing device 300 will now be described in the context of automotive applications. However, it should be understood that the present invention is not limited to this particular context and the combined humidity and temperature sensing device 300 could be used in a range of different applications. In this example, the combined humidity and temperature sensing device 300 is used for providing an in-range diagnostic in a motor vehicle, in particular in a system or in a subsystem of the vehicle's engine.

In this exemplary embodiment, the customer system 306 and the combined humidity and temperature sensing device 300 are configured such that local temperatures, Tcell, measured by the temperature sensor 301 and ambient temperatures, Tair, measured by the additional temperature sensor 305 can be considered valid within a respective predefined temperature validity range of 0° C.<Tcell, Tair<60° C. The customer system 306 and the combined humidity and temperature sensing device 300 could also be configured such that a local relative humidity, RH, measured by the humidity sensor 302 can be considered valid within a predefined relative humidity validity range of 30%<RH<80%.

In the exemplary embodiment, a full in-range diagnostic is not performed after startup of the vehicle's engine for a stabilization period of about 30 min. Then, according to a further variant of the invention, full in-range diagnostics are performed as long as the engine is running, for instance, every minute. The output of each diagnostic is sent to the customer system 306, for instance, a vehicle onboard computer.

The processor 304 performs any of the method steps described previously. When performing the step 202 of checking a temperature offset between the ambient and local temperatures, an identification of a defective temperature sensor could be launched, for instance, when $\Delta T=|Tcell,1-Tair,1|>10°$ C. It is understood that this threshold may vary depending on application conditions, for instance on the arrangement of the additional temperature sensor 305 with respect to the combined humidity and temperature sensing device 300. For a suspicion of a defective temperature sensor, namely when it is determined in step 202 that $\Delta T>10°$ C., the step 204 of controlling the heater 303 to heat up the humidity sensing element of the humidity sensor 302 could be triggered based on the relevance of the variations determined in step 203. For instance, the step 204 could be triggered by the processor 304 if the processor 304 has determined, in step 203, that $\Delta Tair<1°$ C., and $\Delta Tcell<1°$ C., and $\Delta RH<2\%$ in the last 5 seconds. Based on the diagnostic output by the processor 304 in step 206, further actions could be triggered by the processor 304. The processor 304 could output a diagnostic based on which the activity of the heater 303 could be stopped, and/or a degraded mode could be triggered, and/or calibration modes could be triggered, and/or further in-range diagnostic cycles could be triggered.

What is claimed is:

1. A method for providing a diagnostic on a combined humidity and temperature sensing device, comprising:

providing the combined humidity and temperature sensing device including a humidity sensor having a humidity sensing element, a temperature sensor, and a heater;

obtaining an external temperature output from an additional temperature sensor different from the temperature sensor, the additional temperature sensor is arranged so as not to be affected by the heater;

obtaining a first temperature and a first relative humidity output by the combined humidity and temperature sensing device, the first relative humidity is a function of the first temperature;

heating the humidity sensing element with the heater;

obtaining a second temperature and a second relative humidity output by the combined humidity and temperature sensing device after heating the humidity sensing element, the second relative humidity is a function of the second temperature;

determining a difference between the first temperature and the second temperature and a difference between the first relative humidity and the second relative humidity;

outputting diagnostic information representative of a possible malfunction of the humidity sensor when the difference between the first temperature and the second temperature is higher than a predetermined temperature difference threshold and the difference between the first relative humidity and the second relative humidity is lower than a predetermined humidity difference threshold; and outputting a degraded mode information if a possible malfunction of the temperature sensor is determined, the degraded mode information including the external temperature and a relative humidity output by the combined humidity and temperature sensing device as a function of the external temperature.

2. The method of claim 1, further comprising outputting diagnostic information representative of the possible malfunction of the temperature sensor when the difference between the first temperature and the second temperature is lower than the predetermined temperature difference threshold and the difference between the first relative humidity and the second relative humidity is higher than the predetermined humidity difference threshold.

3. The method of claim 1, further comprising outputting diagnostic information representative of a possible malfunction of the heater when the difference between the first temperature and the second temperature is lower than the predetermined temperature difference threshold and the difference between the first relative humidity and the second relative humidity is lower than the predetermined humidity difference threshold.

4. The method of claim 3, further comprising outputting a command for stopping the heater.

5. The method of claim 1, wherein the external temperature is obtained before heating the humidity sensor and before measuring the first temperature and first relative humidity.

6. The method of claim 5, further comprising obtaining a local temperature output from the combined humidity and temperature sensing device and, when a difference between the external temperature and the local temperature is above a predetermined temperature difference threshold, outputting diagnostic information representative of a possible malfunction of either the additional temperature sensor or the combined humidity sensing device.

7. The method of claim 1, further comprising, before heating the humidity sensor, obtaining a first external temperature output from the additional temperature sensor and obtaining a first local temperature and a first relative humidity output from the combined humidity and temperature sensing device.

8. The method of claim 7, further comprising obtaining a second external temperature output from the additional temperature sensor and a second local temperature and a second relative humidity output from the combined humidity and temperature sensing device when a difference between the first external temperature and the first local temperature is above a first predetermined temperature difference threshold.

9. The method of claim 8, further comprising, after a predetermined period of time, determining whether a variation between the first external temperature and the second external temperature and a variation between the first local temperature and the second local temperature are both below a second predetermined temperature difference threshold, and determining whether a variation between the first relative humidity and the second relative humidity is below a predetermined humidity difference threshold.

10. The method of claim 9, wherein the steps of claim 1 are carried out only when the variation between the first external temperature the second external temperature and the variation between the first local temperature and the second local temperature are both determined to be below the second predetermined temperature difference threshold, and the variation between the first relative humidity the and second relative humidity is also determined to be below the predetermined humidity difference threshold.

11. The method of claim 1, further comprising, as a first step, waiting a predetermined amount of time corresponding to a predefined startup or stabilization time of a system using the combined humidity and temperature sensing device.

12. The method of claim 1, wherein the steps are only carried out when the first temperature output from the combined humidity and temperature sensing device is within a predetermined temperature validity range and the first relative humidity output from the combined humidity and temperature sensing device is within a predetermined relative humidity validity range.

13. The method of claim 1, further comprising cycling through the steps a predefined number of times and each cycle is performed a predefined amount of time after a previous cycle.

14. A system, comprising:
a combined humidity and temperature sensing device including a temperature sensor, a humidity sensor having a humidity sensing element, and a heater;
an additional temperature sensor different from the temperature sensor of the combined humidity and temperature sensing device, the additional temperature sensor is arranged so as not to be affected by the heater; and
a processor performing the steps of:
obtaining a first temperature and a first relative humidity output by the combined humidity and temperature sensing device, the first relative humidity is a function of the first temperature;
heating the humidity sensing element with the heater;
obtaining a second temperature and a second relative humidity output by the combined humidity and temperature sensing device after heating the humidity sensing element, the second relative humidity is a function of the second temperature;
determining a difference between the first temperature and the second temperature and a difference between the first relative humidity and the second relative humidity;

outputting diagnostic information representative of a possible malfunction of the humidity sensor when the difference between the first temperature and the second temperature is higher than a predetermined temperature difference threshold and the difference between the first relative humidity and the second relative humidity is lower than a predetermined humidity difference threshold; and outputting a degraded mode information if a possible malfunction of the temperature sensor is determined, the degraded mode information including an external temperature output from the additional temperature sensor and a relative humidity output by the combined humidity and temperature sensing device as a function of the external temperature.

15. The system of claim 14, wherein the additional temperature sensor is external to the combined humidity and temperature sensing device.

16. The system of claim 14, wherein the additional temperature sensor is internal to the combined humidity and temperature sensing device.

\* \* \* \* \*